US011086786B2

(12) United States Patent
Muthiah et al.

(10) Patent No.: US 11,086,786 B2
(45) Date of Patent: Aug. 10, 2021

(54) STORAGE SYSTEM AND METHOD FOR CACHING A SINGLE MAPPING ENTRY FOR A RANDOM READ COMMAND

(71) Applicant: Western Digital Technologies, Inc., San Jose, CA (US)

(72) Inventors: Ramanathan Muthiah, Bangalore (IN); Kshitij Gupta, Uttarpradesh (IN)

(73) Assignee: Western Digital Technologies, Inc., San Jose, CA (US)

( * ) Notice: Subject to any disclaimer, the term of this patent is extended or adjusted under 35 U.S.C. 154(b) by 8 days.

(21) Appl. No.: 16/708,054

(22) Filed: Dec. 9, 2019

(65) Prior Publication Data

US 2021/0173786 A1 Jun. 10, 2021

(51) Int. Cl.
*G06F 12/00* (2006.01)
*G06F 12/0875* (2016.01)
*G06F 12/1009* (2016.01)

(52) U.S. Cl.
CPC ...... *G06F 12/0875* (2013.01); *G06F 12/1009* (2013.01); *G06F 2212/1044* (2013.01); *G06F 2212/608* (2013.01); *G06F 2212/65* (2013.01)

(58) Field of Classification Search
CPC ............. G06F 12/0875; G06F 12/1009; G06F 2212/1044; G06F 2212/608; G06F 2212/65
See application file for complete search history.

(56) References Cited

U.S. PATENT DOCUMENTS

| | | | |
|---|---|---|---|
| 8,117,374 B2 | 2/2012 | Kim et al. | |
| 2014/0258588 A1* | 9/2014 | Tomlin | G06F 12/0246 711/103 |
| 2016/0274797 A1 | 9/2016 | Hahn | |
| 2017/0083438 A1 | 3/2017 | Han et al. | |
| 2017/0235681 A1* | 8/2017 | Kaburaki | G06F 12/0292 711/128 |
| 2017/0315925 A1 | 11/2017 | Yeh | |
| 2018/0293174 A1 | 10/2018 | Song et al. | |
| 2018/0373642 A1* | 12/2018 | Yang | G06F 12/12 |
| 2019/0012081 A1 | 1/2019 | Lee et al. | |
| 2019/0155723 A1 | 5/2019 | Park et al. | |

OTHER PUBLICATIONS

International Search Report dated Aug. 26, 2020 for International Application No. PCT/US2020/024222.

(Continued)

*Primary Examiner* — John A Lane
(74) *Attorney, Agent, or Firm* — Brinks Gilson & Lione (57) ABSTRACT

A storage system and method for caching a single mapping entry for a random read command are provided. In one embodiment, a storage system is provided comprising a memory and a controller. The controller is configured to determine whether a read command received from a host is a random read command, wherein the read command comprises a logical address; and in response to determining that the read command received from the host is a random read command, caching only an associated logical-to-physical address map entry from a logical-to-physical address map stored in the memory instead of caching a larger segment of the logical-to-physical address map that contains the entry and other entries. Other embodiments are provided.

20 Claims, 5 Drawing Sheets

(56) References Cited

OTHER PUBLICATIONS

Written Opinion dated Aug. 26, 2020 for International Application No. PCT/US2020/024222.
Feng, Y. et al.; "Mapping Granularity Adaptive FTL Based on Flash Page Re-programming"; InDesign, Automation and Test in Europe (DATE); IEEE; Mar. 27, 2017; pp. 374-379.
Lv, H. et al.; "Exploiting Minipage-level Mapping to Improve Write Efficiency of NAND Flash"; In2018 IEEE International Conference on Networking, Architecture and Storage (NAS); Oct. 11, 2018; pp. 1-10.
Park, C. et al.; "A Re-configurable FTL (Flash Translation Layer) Architecture for NAND Flash based Applications"; 18$^{th}$ IEEE/IFIP International Workshop on Rapid System Prototyping (RSP'07); 2007; 7 pages.
U.S. Appl. No. 16/246,401 entitled "Fine Granularity Translation Layer for Data Storage Devices" filed Jan. 11, 2019.

* cited by examiner

STORAGE SYSTEM AND METHOD FOR CACHING A SINGLE MAPPING ENTRY FOR A RANDOM READ COMMAND

BACKGROUND

Storage systems are sometimes required to meet random read performance requirements. Usually, the cache requirements are high in random read mode since the storage system typically caches the entire logical-to-physical address map page for almost every read command. Some storage systems use a cache in a host (sometimes referred to as a host memory buffer (HMB)) to cache a portion of a logical-to-physical address map page stored in the memory of the storage system.

DETAILED DESCRIPTION

Overview

By way of introduction, the below embodiments relate to a storage system and method for caching a single mapping entry for a random read command. In one embodiment, a method is provided that is performed in a storage system in communication with a host, wherein the storage system comprises a memory storing a logical-to-physical address translation data structure. The method comprises receiving a read command from the host, wherein the read command comprises a logical address; determining that the host is operating in random read mode; and in response to determining that the host is operating in random read mode, caching only an entry from the logical-to-physical address translation data structure that corresponds to the logical address of the read command, wherein entries of the logical-to-physical address translation data structure that correspond other logical addresses are not cached.

In some embodiments, the storage system determines that the host is operating in random read mode by receiving an indication from the host.

In some embodiments, the storage system determines that the host is operating in random read mode by analyzing a plurality of previously-received read commands from the host.

In some embodiments, the method further comprises, prior to caching the entry: determining an offset of the entry in a page of the logical-to-physical address translation data structure that contains additional entries for other logical addresses; and performing a latch transfer and error correction decoding on a subpage containing the entry.

In some embodiments, the method further comprises using the cached entry to perform logical-to-physical address translation of the logical address of the read command; and deleting the cached entry after the translation is performed.

In some embodiments, the method further comprises receiving another read command from the host with the logical address; and re-caching the entry from the logical-to-physical address translation data structure that corresponds to the logical address.

In some embodiments, the method further comprises receiving a write command for the logical address; and in response to receiving the write command for the logical address, instead of using the cached entry, caching a page of the logical-to-physical address translation data structure that contains the entry and additional entries for other logical addresses.

In another embodiment, a storage system is provided comprising a memory and a controller. The controller is configured to determine whether a read command received from a host is a random read command, wherein the read command comprises a logical address; and in response to determining that the read command received from the host is a random read command, caching only a logical-to-physical address map entry associated with the logical address from a logical-to-physical address map stored in the memory instead of caching a larger segment of the logical-to-physical address map that contains the entry and other entries.

In some embodiments, the controller is further configured to perform at least one of the following to determine whether the read command received from the host is a random read command: receive a directive from the host that the read command received from the host is a random read command; and analyze a plurality of previously-received read commands from the host to detect a pattern, which indicates that the read command received from the host is a random read command.

In some embodiments, the controller is configured to both receive the directive and analyze the plurality of previously-received read commands.

In some embodiments, the controller is further configured to: determine an offset of the entry in the logical-to-physical address map; and perform a latch transfer and error correction decoding on a subpage containing the entry.

In some embodiments, the controller is further configured to: use the cached entry to perform logical-to-physical address translation of the logical address of the read command; and delete the cached entry after the translation is performed.

In some embodiments, the controller is further configured to: receive another read command from the host with the logical address; and re-cache the entry from the logical-to-physical address map that corresponds to the logical address.

In some embodiments, the controller is further configured to: receive a write command for the logical address; and in response to receiving the write command for the logical address, instead of using the cached entry, cache a larger segment of the logical-to-physical address map that contains the entry.

In some embodiments, the memory comprises a three-dimensional memory.

In some embodiments, the storage system is configured to be integrated in the host.

In some embodiments, the storage system is configured to be removably connected with the host.

In another embodiment, a storage system is provided comprising a memory; means for determining whether a read command received from a host is a random read command, wherein the read command comprises a logical address; and means for, in response to determining that the read command is a random read command, using a caching mode in which only a logical-to-physical address Mapping entry for the logical address is cached.

In some embodiments, the means for determining whether the read command is a random read command comprises one or both of the following: means for receiving an instruction from the host that the read command is a random read command; and means for analyzing a plurality of previously-received read commands from the host to detect a pattern, which indicates that the read command received from the host is a random read command.

In some embodiments, storage system further comprises means for determining an offset of the logical-to-physical address mapping entry in a logical-to-physical address map; and means for performing a latch transfer and error correction decoding on a subpage containing the entry.

Other embodiments are possible, and each of the embodiments can be used alone or together in combination. Accordingly, various embodiments will now be described with reference to the attached drawings.

Embodiments

Figures 1A, 1B:
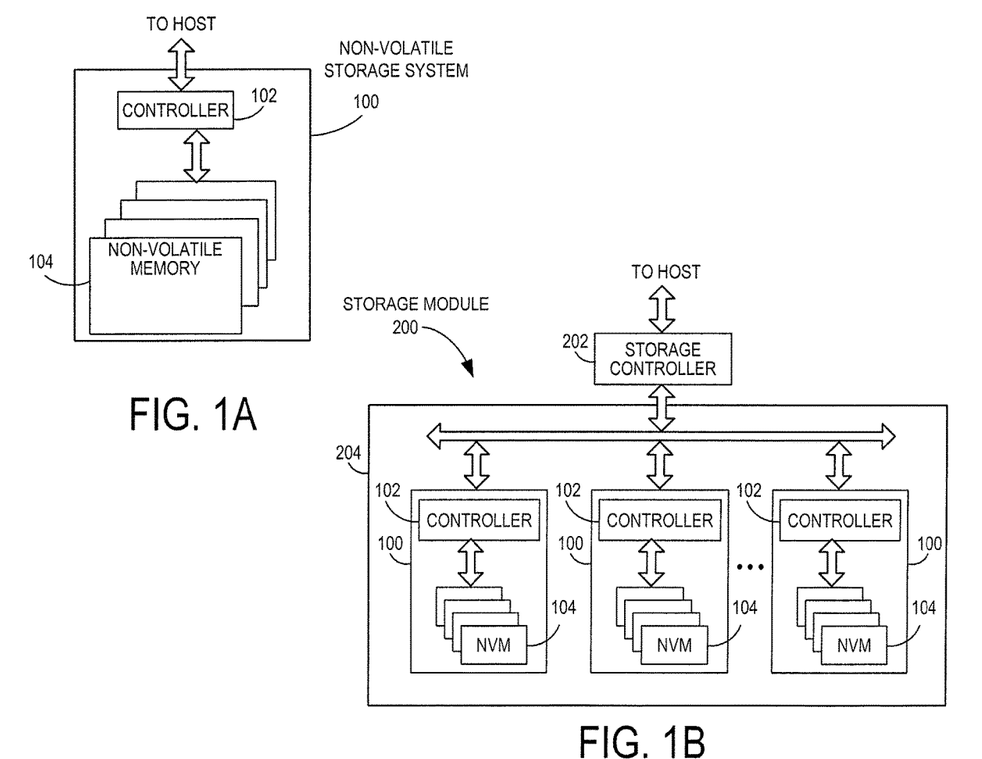
FIG. 1A is a block diagram of a non-volatile storage system of an embodiment.
FIG. 1B is a block diagram illustrating a storage module of an embodiment.
Figure 1C:
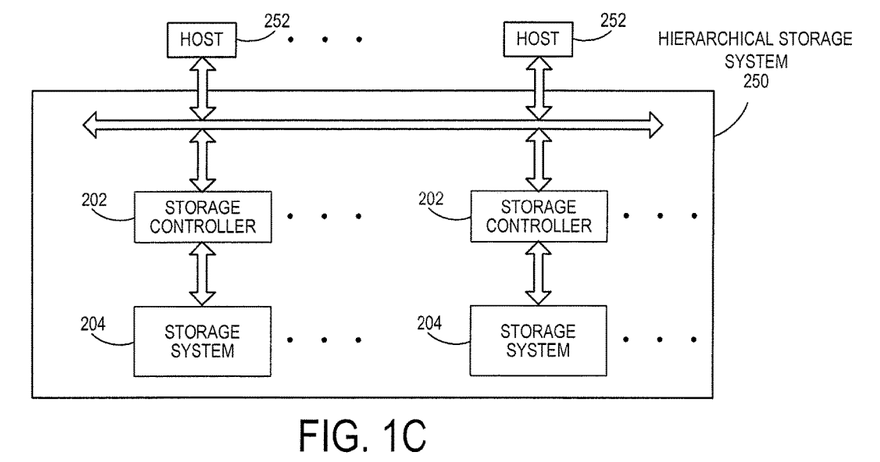
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
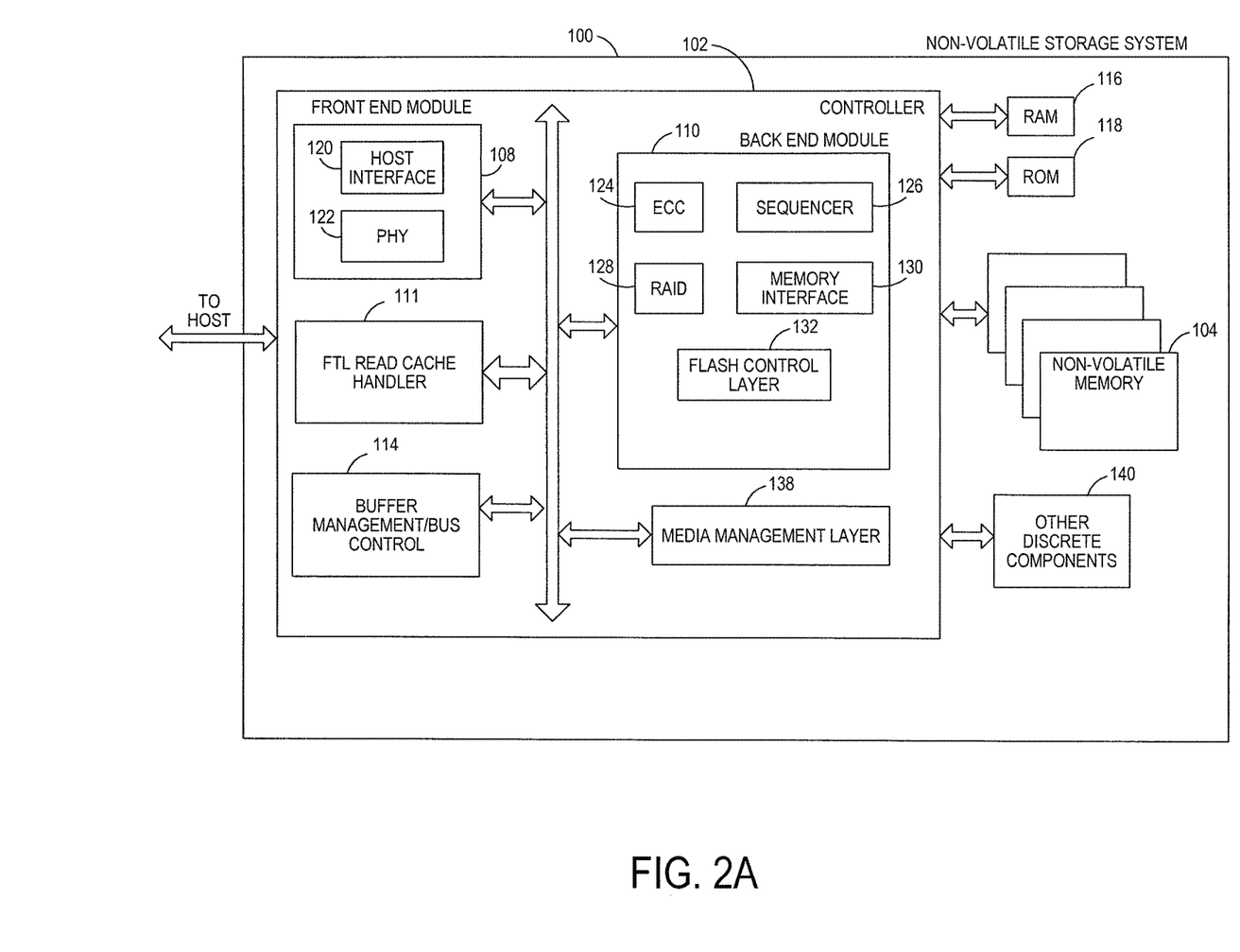
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a flash translation layer (FTL) read cache handler 111, which is discussed in more detail below, and can be implemented in hardware or software/firmware. The FTL read cache handler 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
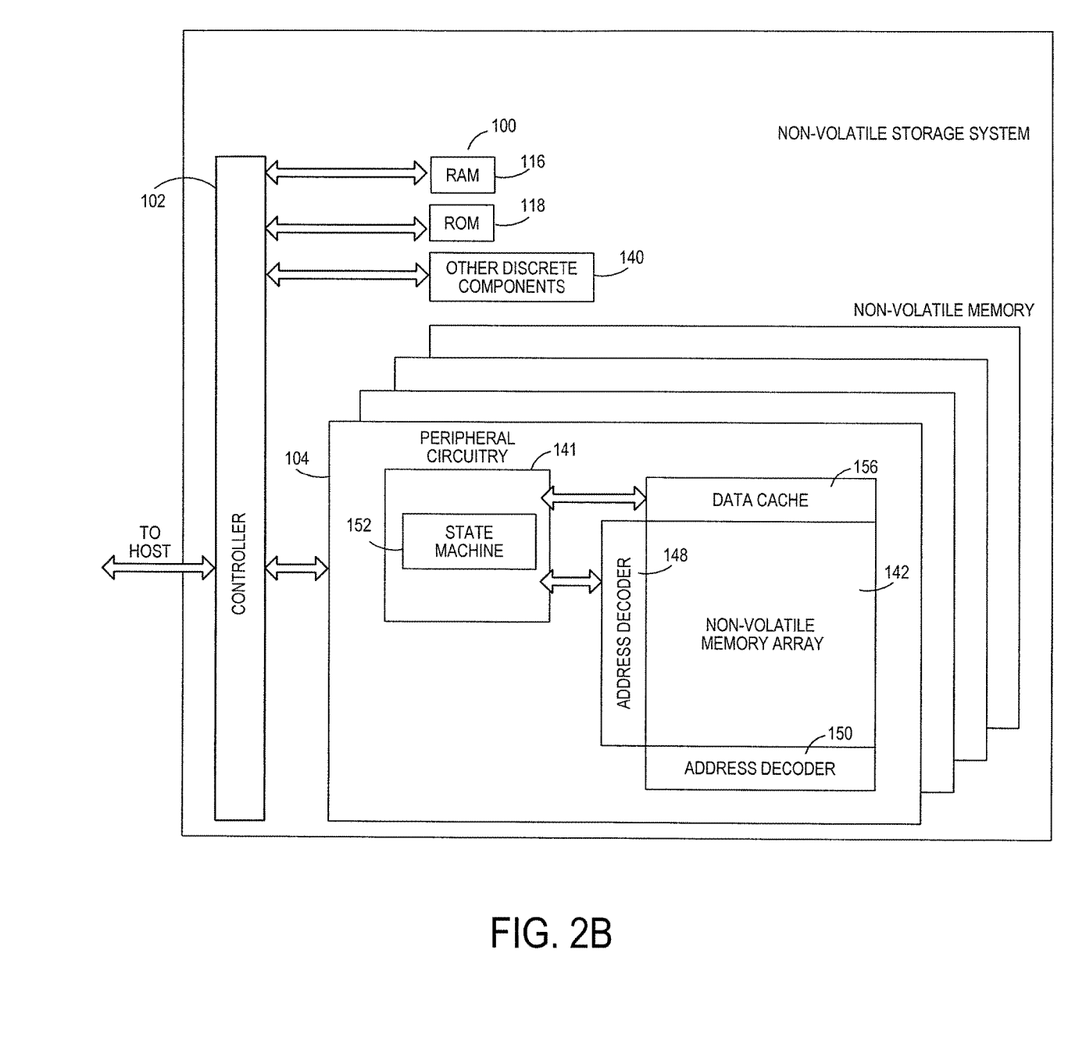
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, storage systems are sometimes required to meet random read performance requirements. As used herein, a random read command refers to a read command that is not a sequential read command (e.g., a read command whose read address is not adjacent to the addresses of immediate prior read commands). A random read mode is a mode in which the host is issuing random read commands to the storage system. Usually, the cache requirements are high in random read mode since the storage system typically caches the entire logical-to-physical address map page for almost every read command. Many storage system architectures maintain a logical-to-physical address map in 16 KB and 32 KB page sizes. In such architectures, loading and maintaining these pages for every 4 KB host data read is usually a lot of overhead. That is, in typical methods, the whole logical-to-physical address map page is sensed, transferred, error correction code (ECC) decoded, and cached for all types of reads.

The problem with such an approach is that the full cached page (which, in a 32 KB logical-to-physical page, is eight ECC entities) may not be required at all during/after the read is performed due to the random nature of the data. For example, in a logical-to-physical address map cache of 128 KB, only four pages can be cached at any point in time, assuming a 32 KB logical-to-physical address map page size. Further, one page involves eight ECC decoding steps. So, even if one of the ECC fails, there is an involved latency even though that particular mapping was not required. The following embodiments can be used to avoid this problem.

In one embodiment, when the storage system 100 determines that a read command from the host is a random read command, the storage system 100 caches only the associated logical-to-physical address map entry from a logical-to-physical address map instead of caching a larger segment of the logical-to-physical address map that contains the entry. This embodiment leverages the fact that the same logical-to-physical address map entry is usually not required once the random read is performed, thereby enabling an exact transfer and immediate trash policy to optimize both performance and resource management.

Figure 3:
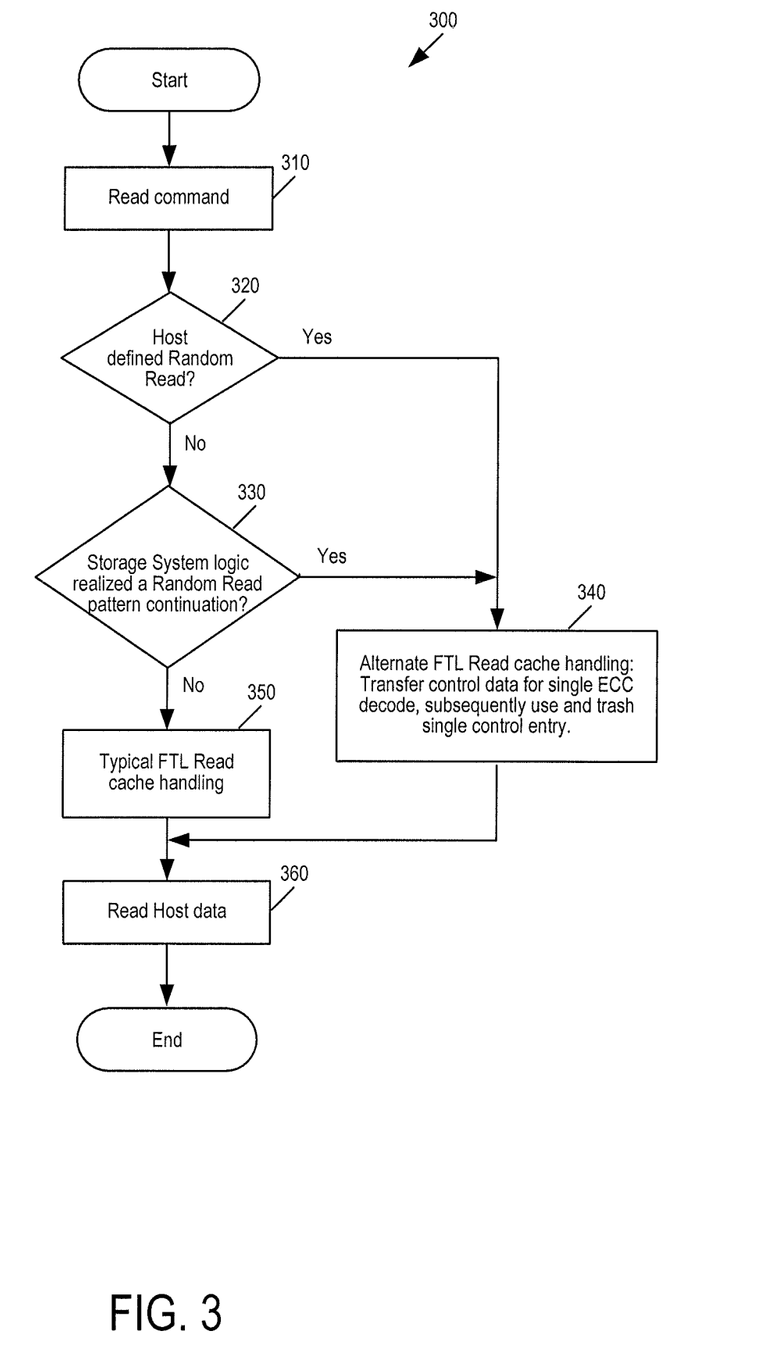
FIG. 3 is a flow chart of a method of an embodiment for caching a single mapping entry for a random read command.

Turning now to the drawings, FIG. 3 is a flow chart 300 of a method of an embodiment for random read caching. This flow chart 300 illustrates the flow of the cache handling mechanism once the storage system 100 determines that the received read command from the host is a random read command. As shown in FIG. 3, a read command is received from the host (act 310). Next, the storage system 100 (e.g., the controller 102 or the flash translation layer (FTL) read cache handler 111) determines whether the read command received from the host is a random read command (or whether the host is operating in random read mode). To do this, the storage system 100 can either rely upon an indication (e.g., a directive, a soft command with an identifier, etc.) from the host and/or can do its own analysis/determination. In the example shown in FIG. 3, the storage system 100 is configured both ways. However, it should be noted that, in other embodiments, the storage system 100 can be configure with one, but not both, functions. So, as shown in FIG. 3, the storage system 100 first determines if the received read command is a host-defined random read (i.e., wherein the host provided an indication to the storage system 100 that the read command is a random read command or that the host is operating in random read mode) (act 320).

If no such indication is provided by the host, in this embodiment, the storage system 100 next uses its own logic/learning from history to determine whether the received read command is a random read command (act 320). For example, the storage system 100 can analyze a plurality of read commands received from the host to detect a pattern and can determine if the read command received from the host is a continuation of that pattern.

If the storage system 100 does not determine that the received read command is a random read command, the storage system 100 uses typical read cache handling, in which an entire page of the logical-to-physical address map is read and cached (act 350). However, if the storage system 100 determines that read command received from the host is a random read command (either because of a host indication or because of storage system deduction), the storage system 100 uses an alternate flash translation layer read cache handling (act 340). Specifically, instead of caching the entire page of the logical-to-physical address map, the storage system 100 caches only the logical-to-physical address map entry that corresponds to the logical address in the read command. Again, this is done if there is first a determination that the read command is a random read command.

Figure 4:
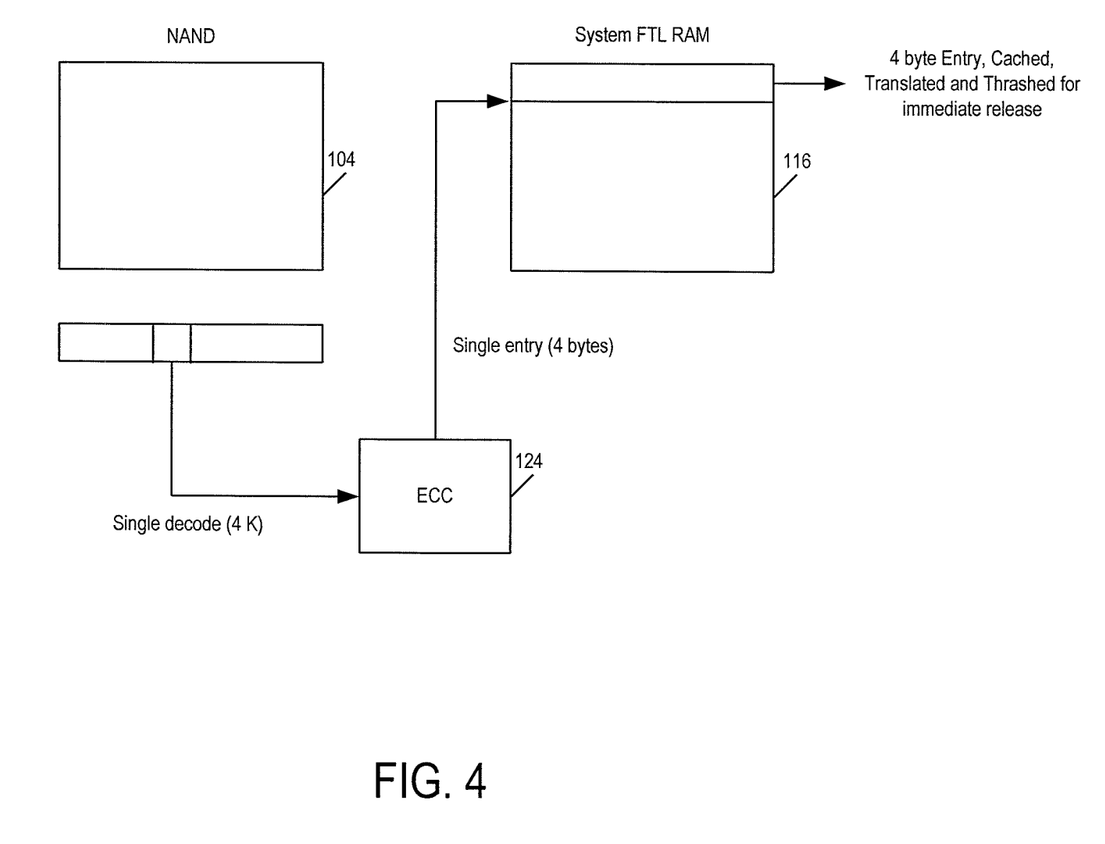
FIG. 4 is a block diagram of an embodiment that illustrates a storage system process after a determination is made that a received read command is a random read command.

The storage system 100 can do this selective caching in any suitable way. For example, in one embodiment, the storage system 100 determines an offset of the entry in the logical-to-physical address map and performs a latch transfer and error correction decoding on a subpage containing the entry. (In one embodiment, the ECC mechanism works on a 4K subpage level; hence, ECC decoding on a single entry alone is not possible, but transfers are possible at the entry level after a subpage decode.) This is illustrated in the block diagram in FIG. 4. In the example shown in FIG. 4, the storage system 100 manages its control cache such that only the relevant control logical-to-physical address page entry (e.g., 4 K) for every read command is translated and trashed, instead of caching or maintaining the whole flash translation layer page. This includes determining the exact 4 KB offset in the full logical-to-physical address control page and performing latch transfer and error code correction decoding of that 4 KB control subpage alone. In this embodiment, the exact logical-to-physical address page entry offset within the decoded 4 KB subpage is the only entry that is momentarily stored in the logical-to-physical address cache. So, for the same example considered above, 128 KB is vast in random read mode since the entry would be trashed immediately for reuse. Further, this embodiment can be used for special handling, on par with typical burst performance modes. In this example, seven error correction code (ECC) decode and transfer operations are eliminated, and the cache is optimized for every random read command.

In this embodiment, after the cached entry is used to perform logical-to-physical address translation of the logical address of the read command and the host data is read (act 360), the cached entry is deleted (trashed), with no reference. In this way, the cached entry is only used once in this embodiment. Accordingly, in this embodiment, if the storage system 100 receives another read command from the host with the same logical address, the storage system 100 would re-cache the entry from the logical-to-physical address map that corresponds to the logical address. This is not anticipated to be a problem, though, as random read patterns rarely re-read the same logical address.

Additionally, because the cached data may not be useful for an update for write commands if it involves a lot of overhead, when a write command is received after the end of the random read mode, the cache may need to be updated with the full logical-to-physical address page, effectively putting the storage system 100 back to the default caching mode. So, in this embodiment, if the storage system 100 receives a write command for the logical address, instead of using the cached entry, the storage system 100 caches a larger segment of the logical-to-physical address map that contains the entry. Further, upon exit of the random read mode (e.g., either via host direction or storage system logic), the storage system 100 can release the space in the cache for the normal flash translation layer cache mode where the entire logical-to-physical address page is cached instead of just an individual entry.

In summary, in one embodiment, the storage system 100 automatically selects a particular loading/caching strategy based on the current workload/environment. This can involve loading and caching logical-to-physical address map page information when processing a random read command received from a host. If the read command is a random read command (and the queue depth is low), this embodiment can use an alternate loading/caching strategy that involves translating and trashing only the relevant control logical-to-physical address translation entry. If the read received from the host is not random, a different (e.g., conventional) loading/caching strategy can be used.

There are several advantages associated with these embodiments. For example, by enabling optimum logical-to-physical address translation resolution for random read patterns, these embodiments optimize performance in terms of reducing the number of control page transfers and error correction code decodes for every random read command, along with the corresponding cache savings. This lowers the resource requirement for the same amount of work and provides better random read performance. These advantages may be especially appreciated if random read commands are received over a relatively long period of time.

Further, in cost-sensitive retail products and low queue-depth systems, reducing control page transfers and decoding of error correction code pages to optimize usage of the cache can result in direct cost benefits. For example, in Secure Digital (SD) Express products using Secure Digital specification 7.0 and above, A1 and A2 random performance may increase with these embodiments. Such storage systems benefit from using an additional flash translation layer usage mode in which instead of swapping entire lookup table segments, the flash translation layer engine reads only a single mapping entry from memory in order to de-reference a logical block address, without caching the neighboring entries in the same segment. For example, with a 32 KB logical-to-physical address page, these embodiments can be more efficient than using the traditional approach, even assuming an architecture that can only hold one segment in random access memory at a time (which can occur with very low-cost controllers).

With an SD-Express product, there is sometimes an issue with command submission, as it is always one command at a time (i.e., command queue (CQ)=1). (With SD-Express, the CQ=1 command submission issue is with the SD mode of operation,) Until this command is settled with host, the next command would not be submitted. So, the entire logical-to-physical address translation page transfer for a random de-reference is always in foreground, with no possible pipelining. This embodiment can help improve this situation with minimal transfer time. Further, since SD-Express products tend to be low form-factor memory cards, using these embodiments to reduce control entry transfers can help optimize thermal effects. Additionally, looking at the read error handling of controller pages can save time if the error is in the neighboring logical-to-physical address translation page slot that is not needed. So, in the above example, there is a savings of 7*4 KB transfers and 7*ECC Decodes per one random read of 4 KB Host data using this embodiment.

Further, there are un-cached flash translation table lookups for queue depth (QD) 1 random reads and a cached lookup for other workloads, which may be especially desirable for very low-cost storage systems. If the storage system 100 is sure that it would not subsequently utilize the flash translation layer page, it may not want to the entire page cached. Instead, caching only enough to de-reference should be good enough. With QD>1, although pipelining can take care of transfers in the background in the storage system 100, this embodiment may still reduce transfers, thereby reducing the power/thermal impact. So, this aspect may be desired by mid-level storage systems as well, which cannot afford the entire flash translation layer page to be cached at all points in time.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for caching a single mapping entry for a random read command, the method comprising:
   performing the following in a storage system in communication with a host, wherein the storage system comprises a memory storing a logical-to-physical address translation data structure:
   receiving a read command from the host, wherein the read command comprises a logical address, wherein an entry in the logical-to-physical address translation data structure corresponds to the logical address of the read command;
   determining that the host is operating in random read mode; and
   in response to determining that the host is operating in random read mode:
   determining an offset of the entry in a page of the logical-to-physical address translation data structure that contains additional entries for other logical addresses;
   performing a latch transfer and error correction decoding on a subpage containing the entry;
   caching only the entry, wherein entries of the logical-to-physical address translation data structure that correspond to other logical addresses are not cached; and
   deleting the cached entry after a single use of the cached entry to perform a logical-to-physical address translation, wherein the cached entry is used only once.

2. The method of claim 1, wherein the storage system determines that the host is operating in random read mode by receiving an indication from the host.

3. The method of claim 1, wherein the storage system determines that the host is operating in random read mode by analyzing a plurality of previously-received read commands from the host.

4. The method of claim 1, further comprising:
   using the cached entry to perform logical-to-physical address translation of the logical address of the read command.

5. The method of claim 4, further comprising
   receiving another read command from the host with the logical address; and re-caching the entry from the logical-to-physical address translation data structure that corresponds to the logical address.

6. The method of claim 1, further comprising
receiving a write command for the logical address; and
in response to receiving the write command for the logical address, instead of using the cached entry, caching a page of the logical-to-physical address translation data structure that contains the entry and additional entries for other logical addresses.

7. The method of claim 1, wherein the memory comprises a three-dimensional memory.

8. The method of claim 1, wherein the storage system is configured to be integrated in the host.

9. The method of claim 1, wherein the storage system is configured to be removably connected with the host.

10. A storage system comprising:
a memory; and
a controller configured to be in communication with the memory, wherein the controller is further configured to:
determine whether a read command received from a host is a random read command, wherein the read command comprises a logical address; and
in response to determining that the read command received from the host is a random read command:
determine an offset of an entry associated with the logical address in a logical-to-physical address map stored in the memory;
perform a latch transfer and error correction decoding on a subpage containing the entry;
cache only the entry instead of caching a larger segment of the logical-to-physical address map that contains the entry and other entries; and
delete the cached entry after a single use of the cached entry to perform a logical-to-physical address translation, wherein the cached entry is used only once.

11. The storage system of claim 10, wherein the controller is further configured to perform the following to determine whether the read command received from the host is a random read command:
receive a directive from the host that the read command received from the host is a random read command.

12. The storage system of claim 11, wherein the controller is configured to both receive the directive and analyze the plurality of previously-received read commands.

13. The storage system of claim 10, wherein the controller is further configured to:
use the cached entry to perform logical-to-physical address translation of the logical address of the read command.

14. The storage system of claim 13, wherein the controller is further configured to:
receive another read command from the host with the logical address; and
re-cache the entry from the logical-to-physical address map that corresponds to the logical address.

15. The storage system of claim 10, wherein the controller is further configured to:
receive a write command for the logical address; and
in response to receiving the write command for the logical address, instead of using the cached entry, cache a larger segment of the logical-to-physical address map that contains the entry.

16. The storage system of claim 10, wherein the memory comprises a three-dimensional memory.

17. The storage system of claim 10, wherein the storage system is configured to be integrated in the host.

18. The storage system of claim 10, wherein the storage system is configured to be removably connected with the host.

19. The storage system of claim 10, wherein the controller is further configured to perform the following to determine whether the read command received from the host is a random read command:
analyze a plurality of previously-received read commands from the host to detect a pattern, which indicates that the read command received from the host is a random read command.

20. A storage system comprising:
a memory;
means for determining whether a read command received from a host is a random read command, wherein the read command comprises a logical address; and
means for, in response to determining that the read command is a random read command:
determining an offset of an entry associated with the logical address in a logical-to-physical address map stored in the memory;
performing a latch transfer and error correction decoding on a subpage containing the entry; and
using a caching mode in which only the entry is cached; and
deleting the cached entry after a single use of the cached entry to perform a logical-to-physical address translation, wherein the cached entry is used only once.

* * * * *